United States Patent [19]

Agouri et al.

[11] 4,126,648
[45] Nov. 21, 1978

[54] LOW-DENSITY POLYETHYLENE-BASED POLYMER COMPOSITION FOR MANUFACTURING THIN FILMS OR SHEATHS

[75] Inventors: Elias Agouri; Robert Laputte; Jacques Rideau, all of Pau, France

[73] Assignee: Ato Chimie, Courbevoie, France

[21] Appl. No.: 813,293

[22] Filed: Jul. 6, 1977

[30] Foreign Application Priority Data

Jul. 8, 1976 [FR] France ............................... 76 20918

[51] Int. Cl.$^2$ ..................... C08F 255/02; C08F 291/00
[52] U.S. Cl. ............................................... 260/878 R
[58] Field of Search .................................... 260/878 R

[56] References Cited

U.S. PATENT DOCUMENTS

| | | | |
|---|---|---|---|
| 2,868,762 | 1/1959 | Oakes | 260/878 R |
| 3,133,889 | 5/1964 | Hazenberg et al. | 260/878 R |
| 3,176,051 | 3/1965 | Gregorian et al. | 260/878 R |
| 3,226,454 | 12/1965 | Marans et al. | 260/878 R |

*Primary Examiner*—Alan Holler
*Attorney, Agent, or Firm*—Ostrolenk, Faber, Gerb & Soffen

[57] ABSTRACT

The invention concerns a low-density polyethylene-based polymer composition for producing films or sheaths. The present invention provides a low-density polyethylene-based polymer composition for manufacturing films or sheaths, particularly thin films or sheaths having a thickness of less than twenty microns, said polymer composition being constituted by a graft copolymer comprising at least one styrene monomer, possibly mixed with at least one acrylic monomer, said monomer or monomers being grafted onto a trunk constituted by a pre-formed combination or alloy containing by weight, 50 to 95% low-density polyethylene and 50 to 5% high density polyethylene and/or polypropylene, the proportion of the grafted styrene monomer or mixture of monomers being comprised between 5 and 50% by weight of said graft copolymer.

12 Claims, No Drawings

LOW-DENSITY POLYETHYLENE-BASED POLYMER COMPOSITION FOR MANUFACTURING THIN FILMS OR SHEATHS

The present invention is related to low-density polyethylene-based polymer compositions for manufacturing films or sheaths, and more particularly to such compositions which are adapted for use in manufacturing films or sheaths having a thickness of less than twenty microns.

In certain technical fields of the packaging industry, such as the manufacture of packings for food products, e.g. bags for sweets, dried fruit or vegetables, or sheaths for packing clothing articles, it is known how to use films or sheaths made of plastic material which, in addition to the required mechanical properties, such as an elevated elastic limit or yield point and a reduced elongation under ultimate tensile stress, also have hand and rustling properties comparable to those of paper.

It is well known that the "hand" of paper is defined by the ratio of the specific bulk of the paper, expressed in grams per square meter, to the thickness of said paper, expressed in microns.

The term "rustling" designates the characteristic noise produced by certain sorts of paper, especially sulphurized paper, when it is crumpled.

According to a known method, such films or sheaths are manufactured from high-density polyethylene having a high molecular weight which is prepared by Ziegler catalysis under particular operating conditions. However, the preparation of such high-density polyethylene by synthesis is complicated and expensive, and consequently the manufacturing cost of the films or sheaths made from this particular polyethylene is high.

It is also known that low-density polyethylene which can be prepared by synthesis under economically favourable conditions is not adapted for use in producing this type of films or sheaths, because this type of polyethylene is soft and furthermore the films and sheaths manufactured from this product do not exhibit the required rustling properties.

The research which led to the present invention has shown that there are polymer compositions which, in spite of the fact that they contain a comparatively large amount of low-density polyethylene, permit the production of films or sheaths, and more particularly thin films and sheaths having a thickness of considerably less than twenty microns, which exhibit mechanical properties, hand and rustling properties at least equivalent, and in some cases superior, to those of films or sheaths produced from high-density polyethylene of the particular kind mentioned above, said films or sheaths furthermore having a satiny aspect, which constitutes an advantageous feature from the commercial point of view. Furthermore, the high low-density polyethylene content of polymer composition according to the invention allows a considerable increase of the rate of transformation of said compositions into films or sheaths, and the films or sheaths thus obtained can be more easily welded by application of heat and pressure.

The present invention provides a low-density polyethylene-based polymer composition for manufacturing films or sheaths, particularly thin films or sheaths having a thickness of less than twenty microns, said polymer composition being constituted by a graft copolymer comprising at least one styrene monomer, possibly mixed with at least one acrylic monomer, said monomer or monomers being grafted onto a trunk constituted by a pre-formed combination or alloy containing, by weight, 50 to 95% low-density polyethylene and 50 to 5% high density polyethylene and/or polypropylene, the proportion of the grafted styrene monomer or mixture of monomers being comprised between 5 and 50% by weight of said graft copolymer.

The graft copolymer constituting the polymer composition according to the present invention preferably contains, by weight, 10 to 35% of at least one styrene monomer or of a mixture of at least one styrene monomer with at least one acrylic monomer grafted onto the pre-formed trunk constituted by the low-density polyethylene and high-density polyethylene and/or polypropylene alloy.

Said pre-formed combination or alloy preferably contains, by weight, 55 to 85% low-density polyethylene and 45 to 15% high-density polyethylene and/or polypropylene.

By way of example, but not of limitation, the following styrene monomers which can be grafted onto the said preformed alloy: styrene, alpha-alkyl-styrenes such as alpha-methylstyrene, alpha-halostyrenes such as alpha-chlorostyrene and alpha-bromostyrene, vinylhalobenzenes vinyl-alkylbenzenes such as vinylchlorobenzene, vinyltoluene, vinylethylbenzene. The acrylic monomers which can be associated to the styrene monomers with a view to forming the chains grafted onto the above mentioned pre-formed alloy may advantageously be selected from the group of acrylic nitriles such as methacrylonitrile, acrylonitrile and alpha-chloracrylonitrile.

The low-density polyethylene which constitutes a part of the alloy forming the trunk of the graft copolymer is a polyethylene whose density is comprised between 0.910 and 0.940. A polyethylene of this kind may be obtained by polymerization of ethylene using a method of radical polymerization performed in an autoclave or in a tubular reactor.

The high-density polyethylene is a polyethylene having a density higher than 0.940, and more particularly a density comprised between 0.940 and 0.980. This type of polyethylene is generally obtained by polymerization of ethylene by means of a coordination catalysis method using, i.e., coordination catalysts of the Ziegler-Natta type.

The polymer compositions according to the present invention are prepared by two successive steps. The first one of said steps consists in preparing the pre-formed alloy, and the second step consists in grafting the selected monomer or monomers onto the thus prepared alloy.

The pre-formed alloy of low-density polyethylene and high-density polyethylene and/or polypropylene is prepared by mixing the selected ingredients in the molten state, for instance, in an extruder or in any other type of mixing apparatus. To this end, each constituent of the alloy to be prepared can be introduced separately into the extruder or mixing apparatus which is maintained at a convenient temperature, the mixture then being stirred until a homogeneous product is obtained. It is also possible to pre-mix the constituents of the alloy in powder or granulate form using, for example, a mixing drum or a reactor provided with stirring means, and to introduce the thus obtained mixture into an extruder or into another mixing or stirring apparatus to produce a perfectly homogeneous mixture.

The melt index of the low-density polyethylene may vary within large limits. Said melt index may be comprised between 0.2 and 4. Furthermore, the melt index of the high-density polyethylene and/or polypropylene is selected preferably so as to be substantially close to that of the low-density polyethylene, with a view to producing the pre-formed alloy under optimum conditions as far as homogeneity is concerned.

The styrene monomer or monomers, or the mixture of styrene monomer or monomers and acrylic monomer or monomers can be grafted by any method known in the art. More particularly, the method of grafting in aqueous suspension described in French Patent Specification No. 1,588,502 may be used to this end.

The graft copolymers constituting the compositions according to the present invention may advantageously be the raw copolymers produced in the grafting reaction after elimination of the non-polymerized monomer or monomers.

The compositions described by the invention may also contain, in addition to polymeric matter, additive substances such as plasticizers, stabilisers, lubricants, anti-oxidants, colouring agents, pigments, etc. which are used in a manner well known per se in the field of thermoplastic compositions for manufacturing films or sheaths, and more particularly thin films and sheaths.

Said films or sheaths may be manufactured from the compositions according to the invention by any known method, and more particularly by the method of blow-extrusion described, e.g., in the publication "PLASTICS FILM TECHNOLOGY" (W.R.R. PARK, Ed.).

The invention will be described in a more detailed manner by the example following which is given by way of illustration, but not of limitation.

EXAMPLE

In an extruder of the type known under the commercial designation of "SAMAFOR", which operated at 190° C., various alloys of a low-density polyethylene (LDPE) having a density of 0.924 and a melt index $MI_2^{190} = 2$ were prepared with a high-density polyethylene (HDPE) having a density of 0.965 and a melt index $MI_2^{190} = 0.6$ or with a polypropylene (PP) having a density of 0.988 and a melt index $MI_{3.8}^{230} = 2$, the constituents being introduced separately and stirred, whereafter the resulting alloys were granulated.

Using the thus obtained granular alloys, grafted copolymers constituting compositions according to the present invention were prepared.

1200g water, 266 granulated alloy as well as 8.3g sodium phosphate and 4.9g calcium chloride as suspension agents were introduced into an autoclave having a capacity of 2 liters. The monomer or monomer mixture to be grafted was added to the thus obtained suspension, whereafter tertiary butyl-perbenzoate was added as a grafting catalyst.

The autoclave was then scavenged with nitrogen, and closed, whereafter its temperature was raised to 140° C.; this temperature was maintained for two hours.

After subsequent cooling, the content of the autoclave was poured onto a filter on which the raw product of the grafting reaction was separated from the aqueous phase. This raw product was washed in order to eliminate the monomer fraction which had not reacted and the suspension agents which might still be present; the raw copolymer was then recovered and dried in an oven.

Each one of the thus prepared copolymers was then transformed into thin sheaths having a width of about 25 cm by blow-extrusion performed by means of a sheath extruder of the type known under the commercial designation of "SAMAFOR-B:65"; the inflating rate was 1.5 (tests A to G).

By way of comparison sheaths were prepared under the same conditions from HDPE alone (test H), from LDPE alone (test I), from a mixture which had been reconstituted from the homopolymers HDPE + LDPE + polystyrene (test J), as well as from a mixture of a copolymer obtained by grafting styrene onto LDPE (test K).

The sheaths obtained from the various experiments were submitted to tests for determining certain mechanical properties (yield strength, Dart), the rustling properties and a value called "limit thickness" which characterises the ease of production of thin sheaths and represents for a production rate of 50 m/min the thickness, expressed in microns, below which it is no longer possible to produce a sheath on account of frequent ruptures.

The specific information characterising the various compositions are listed in Table I, as regards the compositions according to the invention; and in Table II as regards the compositions tested by way of comparison, while the results of the various measurements and evaluations are listed in Table III.

All the sheaths prepared from batches A to G, i.e. from LDPE-based compositions according to the invention exhibit a satiny aspect, as well as mechanical properties and rustling properties close (tests A and C) or superior (tests B and D) to those of the sheaths made from high-density polyethylene alone (test H). Furthermore, the limit thickness of the sheaths produced according to tests procedures A to G varies between a value very close (tests A and C) to the one measured on the sheaths obtained in test H and a value that may be considerably lower (tests B and D).

TABLE I

| | Compositions according to the invention | | | | |
|---|---|---|---|---|---|
| | Preformed alloy | | | Grafted monomer | |
| | | 2nd component | | | |
| Test No. | LDPE proportion in the alloy (% by weight) | Nature | Proportion in the alloy (% by weight) | Nature | Proportion in the graft copolymer (% by weight) |
| A | 80 | HDPO | 20 | Styrene | 30 |
| B | 60 | HDPE | 40 | Styrene | 20 |
| C | 80 | PP | 20 | Styrene | 30 |
| D | 52 | HDPE | 48 | Styrene | 22 |
| E | 70 | HDPE | 30 | Chloro-styrene | 25 |
| F | 60 | HDPE | 40 | Styrene + methyl-styrene | 20 |
| G | 80 | HDPE | 20 | Styrene + acrylonitrile | 18 |

TABLE II

| Test No. | Reference Compositions Constituents | Proportion (% by weight) |
|---|---|---|
| H | HDPE | 100 |
| I | LDPE | 100 |
| J | LDPE | 61 |
|   | HDPE | 15 |
|   | polystyrene | 24 |
| K | HDPE | 15 |
|   | grafted PS/LDPE* | 85 |

*grafted PS/LDPF = grafted with styrene on low-density polyethylene containing 28% by weight of styrene.

TABLE III

Properties of the sheaths

| Test No. | Sheaths having a thickness of 50 microns | | | Limit thickness (microns) |
|---|---|---|---|---|
|   | Yield strength (kg/cm$^2$) | Dart (g) | Rustling (**) |   |
| A | 196 | 50 | B  | 11 |
| B | 245 | 45 | TB | 4  |
| C | 190 | 47 | B  | 13 |
| D | 216 | 46 | TB | 9  |
| E | 200 | 45 | B  | 14 |
| F | 235 | 43 | TB | 5  |
| G | 130 | 44 | B  | 15 |
| H | 165 | 46 | B  | 12 |
| I | 200 | 70 | N  | 25 |
| J | 105 | 18 | B  | 48 |
| K | 138 | 38 | M  | 24 |

**The symbols used for defining the rustling properties have the following significations: N = nil, M = medium, B = good, TB = very good It must also be pointed out that the sheaths made from low-density polyethylene alone (test I) do not exhibit any noticeable rustling properties and have a limit thickness which equals about twice that of the sheaths made from high-density polyethylene alone (test H) or made from the least advantageous compositions according to the invention (tests A and C.

As far as the sheaths produced from the reconstituted mixture of LDPE, HDPE and polystyrene homopolymers (test J) are concerned, it was clearly shown that these sheaths exhibited very poor mechanical properties as compared to those of the sheaths made from high-density polyethylene alone (test H) or from the compositions according to the invention (tests A to G), and particularly as compared to the sheaths made from the composition according to test A wherein the proportions of LDPE, HDPE and polystyrene are somewhat similar, although their rustling properties are satisfactory.

The sheaths made from the mixture (test K) of one of the constituents of the alloy (HDPE) and a graft copolymer of styrene onto the other constituent of the alloy (graft copolymer of styrene on LDPE) also exhibit mechanical properties which are less favourable than those of the sheaths made from compositions according to the invention or from HDPE alone, their rustling properties are medium, and their limit thickness is comparable to that of the sheaths made of LDPE, i.e. relatively high. This fact shows that LDPE must be mixed with HDPE or PP prior to the grafting of the styrene monomer if it is desired to obtain, in accordance with the object of the present invention, sheaths having properties which are comparable or superior to those of sheaths made of high-density polyethylene alone.

It should be well understood that the invention is not limited to the embodiments disclosed herein above and that numerous modifications and variants may be envisaged by those skilled in the art without departing from the spirit of the invention as defined in the appended claims.

What is claimed is:

1. A low-density polyethylene-based polymer composition for producing films or sheaths, and more particularly films or sheaths having a reduced thickness, said composition being constituted by a graft copolymer of at least one styrene monomer or a mixture of at least one styrene monomer and at least one acrylic monomer, on a trunk constituted by a pre-formed alloy containing, by weight, 50 to 95% low-density polyethylene and 50 to 5% high-density polyethylene and/or polypropylene, the proportion of the styrene monomer or monomers or of the styrene monomer and acrylic monomer mixture in said graft copolymer being comprised between 5 and 50% by weight of said graft copolymer.

2. A composition according to claim 1, wherein said pre-formed alloy contains, by weight, 55 to 85% low-density polyethylene and 45 to 15% high-density polyethylene and/or polypropylene.

3. A composition according to claim 1, wherein the proportion of styrene monomer or monomers or of the styrene monomer and acrylic monomer mixture contained in said graft copolymer is comprised between 10 and 35% by weight of said graft copolymer.

4. A composition according to claim 1, wherein the monomer or monomers grafted onto said pre-formed alloy is or are selected from the group consisting of styrene, alpha-methylstyrene, alpha-chlorostyrene, and mixtures thereof with an acrylic nitrile selected from the group consisting of acrylonitrile, methacrylonitrile and alpha-chloracrylonitrile.

5. A composition according to claim 1, wherein the low-density polyethylene which is part of said alloy constituting said trunk of the graft copolymer has a melt index comprised between 0.2 and 4.

6. A composition according to claim 1, wherein said graft copolymer is constituted by the raw product obtained by the grafting reaction, the non-polymerized monomer or monomers being eliminated from said raw product.

7. A film or sheath, especially a film or sheath having a thickness of less than 20 microns, which is manufactured from a polymer composition according to claim 1.

8. A composition according to claim 1, wherein said graft copolymer is constituted by the raw product obtained from the grafting reaction performed in aqueous suspension, the non-polymerized monomer or monomers being eliminated from said raw product.

9. A method of preparing a low-density polyethylene-based polymer composition for manufacturing films or sheaths, especially thin films or sheaths, comprising the steps of pre-forming a polymer alloy containing, by weight, 50 to 95% low density polyethylene and 50 to 5% high-density polyethylene and/or polypropylene by stirring the constituents of said alloy in the molten state, and grafting onto the thus prepared alloy at least one styrene monomer or a mixture of at least one styrene monomer with at least one acrylic monomer, the proportion of the grafted monomer or monomers being so selected that the final copolymer contains, by weight, 5 to 50% grafted monomer or monomers.

10. The method according to claim 9, wherein the monomers grafted onto said pre-formed alloy are selected from the group consisting of styrene, alpha-methylstyrene, alpha-chlorostyrene and mixtures thereof with an acrylic nitrile selected from the group consisting of acrylonitrile, methacrylonitrile and alpha-chloracrylonitrile.

11. The method according to claim 9, wherein the grafting reaction is performed in aqueous suspension and in the presence of a radical initiator.

12. The method according to claim 9, wherein said alloy contains, by weight, 55 to 85 percent low density polyethylene and 45 to 15 percent high density polyethylene and/or polypropylene and wherein the proportion of the grafted monomer or monomers is so selected that the final copolymer contains, by weight, 10 to 35 percent grafted monomer or monomers.

* * * * *